(12) United States Patent
Pasch

(10) Patent No.: US 6,371,284 B1
(45) Date of Patent: Apr. 16, 2002

(54) DEVICE FOR CONVEYING OBJECTS

(75) Inventor: Lothar Pasch, WV Terborg (NL)

(73) Assignees: Johan Hendrik; Bernard Kaak, both of Gaanderen (NL)

( * ) Notice: Subject to any disclaimer, the term of this patent is extended or adjusted under 35 U.S.C. 154(b) by 0 days.

(21) Appl. No.: 09/466,119

(22) Filed: Dec. 17, 1999

(30) Foreign Application Priority Data

Dec. 18, 1998 (NL) ............................................. 1010842

(51) Int. Cl.$^7$ .............................................. B65G 15/54
(52) U.S. Cl. ...................... 198/848; 198/853; 198/851; 198/850
(58) Field of Search ................................ 198/848, 853, 198/851, 850

(56) References Cited

U.S. PATENT DOCUMENTS

| | | | | |
|---|---|---|---|---|
| 3,425,536 A | * | 2/1969 | Shader ........................ | 198/189 |
| 3,788,461 A | * | 1/1974 | Friesen ........................ | 198/229 |
| 4,078,655 A | * | 3/1978 | Roinestad .................... | 198/848 |
| 4,643,129 A | * | 2/1987 | Sari ............................. | 118/641 |
| 4,754,871 A | * | 7/1988 | Gustafson ................... | 198/848 |
| 4,953,693 A | * | 9/1990 | Draebel ....................... | 198/853 |
| 4,972,942 A | * | 11/1990 | Faulkner ...................... | 198/853 |
| 5,065,860 A | * | 11/1991 | Faulkner ...................... | 198/848 |
| 5,293,989 A | * | 3/1994 | Garbagnati .................. | 198/853 |
| 5,404,998 A | * | 4/1995 | Frye ............................. | 198/848 |
| 5,566,817 A | * | 10/1996 | Meeker ........................ | 198/848 |
| 5,954,187 A | * | 9/1999 | Hager .......................... | 198/778 |

* cited by examiner

Primary Examiner—Joseph E. Valenza
Assistant Examiner—Rashmi Sharma
(74) Attorney, Agent, or Firm—Thomas, Kayden, Horstemeyer & Risley

(57) ABSTRACT

Device for conveying objects comprising a large numbers of rods. The device has opposite edges. Each rod has a first and a second end, adjacent rods being mutually connected at their ends by connection elements. Each connection element is substantially S-shaped in top view and is provided with a first free end which is situated directed to a centre between the first and second end of the rod, with a second free end which is situated directed to an edge concerned of the device, with a first transverse member and a second transverse member, with a first connection member which connects the first free end to the first transverse member, with a second connection member which connects the first transverse member to the second transverse member, and with a third connection member which connects the second transverse member to the second free end. The second free end of the connection element is situated at a distance from the second connection member. The first connection member of the connection element is provided with a first opening through which the one of the adjacent rods extends and with a second opening through which the other of the adjacent rods extends. The second connection member of the connection element is provided with a third opening through which the one of the adjacent rods extends over a distance and with a fourth opening through which the other of the adjacent rods extends. The connection element is secured to the one of the adjacent rods near the first free end of the connection element.

20 Claims, 2 Drawing Sheets

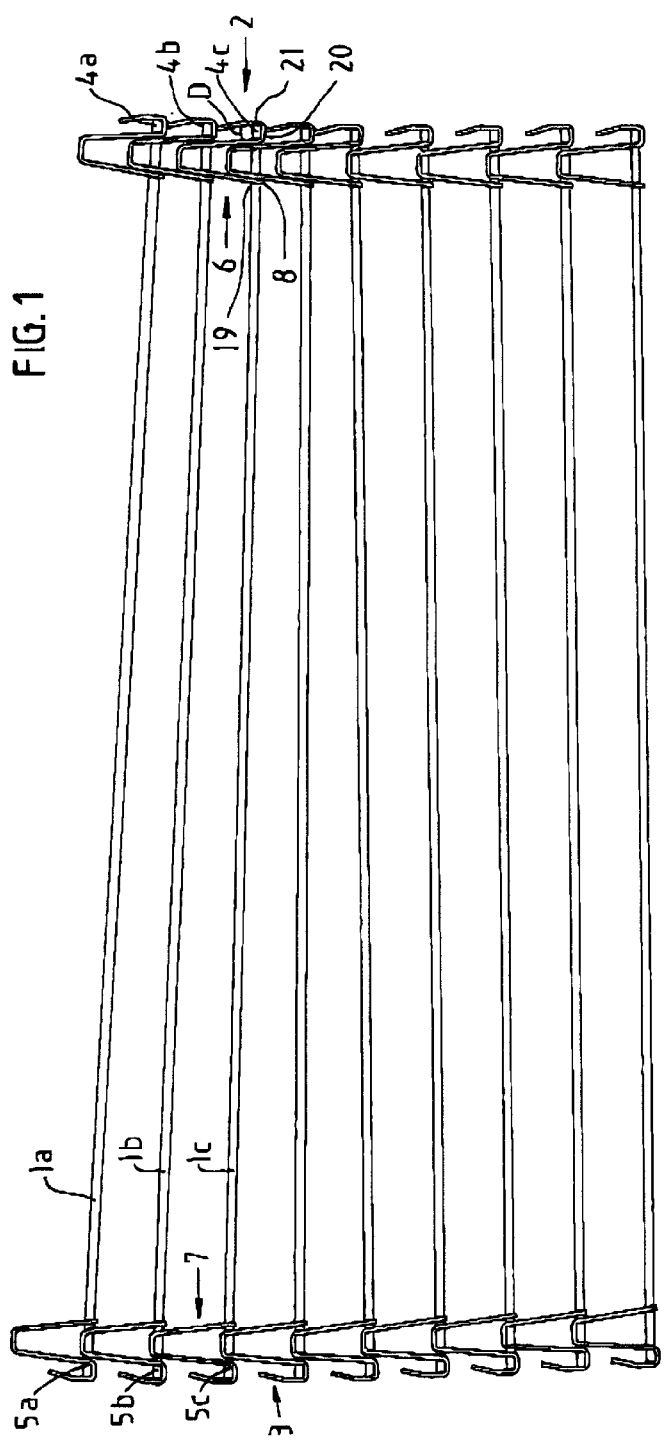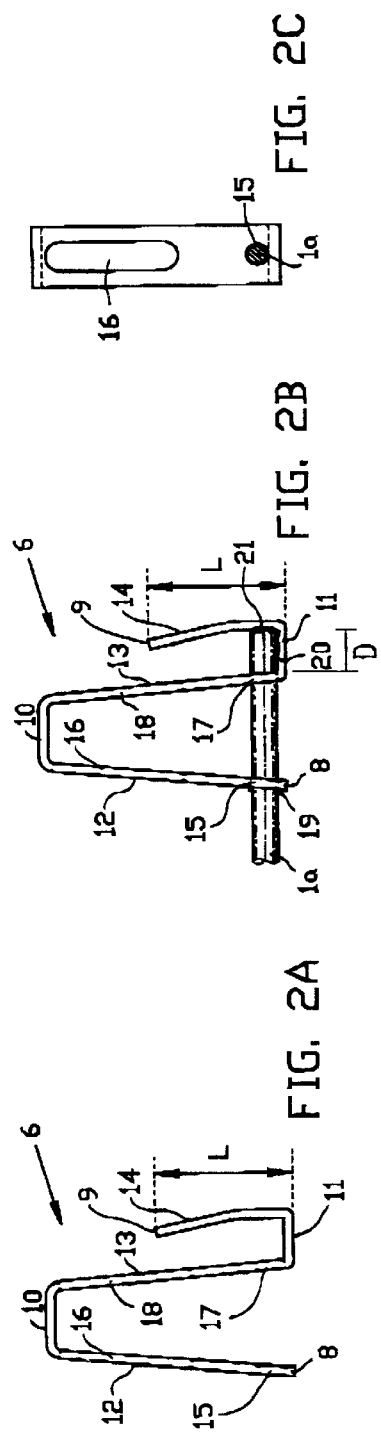

DEVICE FOR CONVEYING OBJECTS

The present invention relates to a device for conveying objects comprising a large numbers of rods, each having ends, the adjacent rods being mutually connected at their ends by connection elements.

In most known devices the rods extend with their ends beyond the connection elements, and said ends are usually provided with loose heads welded to the ends. Said loose heads, and in particular the welds which may be undesirable projections, are unwanted because of wear and tear and damages. In particular when such devices travel around drums, the drum may be damaged. Although solutions to these problems have been suggested, for instance the use of connection elements made of synthetic material instead of metal connection elements, these solutions lead to expensive and complex constructions There Is a need therefore for a device having rods and connection elements, which device has a cheap and a simple construction and which in a suitable manner also prevents the wear and tear caused by the ends of the rods.

It is an object of the present invention to provide a device which meets these needs.

To that end the present invention provides a device for conveying objects comprising a large numbers of rods, the device having opposite edges, each rod having a first and a second end, adjacent rods being mutually connected at their ends by connection elements, each connection element being substantially S-shaped in top view and being provided with a first free end which is situated directed to a centre between the first and second end of the rod, with a second free end which is situated directed to an edge concerned of the device, with a first transverse member and a second transverse member, with a first connection member which connects the first free end to the first transverse member, with a second connection member which connects the first transverse member to the second transverse member, and with a third connection member which connects the second transverse member to the second free end, the second free end of the connection element being situated at a distance from the second connection member, the first connection member of the connection element being provided with a first opening through which the one of the adjacent rods extends and with a second opening through which the other of the adjacent rods extends, the second connection member of the connection element being provided with a third opening through which the one of the adjacent rods extends over a distance and with a fourth opening through which the other of the adjacent rods extends, and the connection element being secured to the one of the adjacent rods near the first free end of the connection element. Such a device with S-shaped connection elements offers a cheap, simple and reliable construction, the ends of the rods lying within the S-shaped connection element, and not extending beyond the third connection member.

The distance over which the rod extends beyond the second connection member is of course chosen such that the rod, when the device is used, cannot come loose from the third opening. In a preferred embodiment of a device according to the present invention the distance is such that the rod concerned extends until in abutment with the third connection member. As a result a more stable construction is obtained.

Although the place of securing mentioned above suffices for the attachment of the rod concerned to the connection element concerned, in a preferred embodiment of a device according to the present invention the rod concerned is secured at a further location to the second transverse member of the connection element. Alternatively or additionally the rod concerned can be secured to the third connection member of the connection element at (yet) a further location.

When the third connection member has a bent shape, so that the second free end is situated further away from the edge of the device than the rest of the third connection member, the edges of the device, in particular the second free ends of the connection elements, In all cases do not form unwanted projections which could cause possible damage to the drums.

In a preferred embodiment of a device according to the present invention for conveying objects along a track, in which the track may have a curve up to a certain radius, the third connection member has a pre-determined length, which determines the certain radius. When travelling a curve of a minimal radius, at an edge of the device the second free end of the connection element will abut the second transverse member of an adjacent connection element, the distance between the adjacent rods being minimal here. At the other edge of the device the distance between the adjacent rods is maximal. The difference in distances between the rods near the opposite edges, which difference determines the minimal radius of a curve to be travelled, therefore is determined by the length of the third connection member.

In order to reduce wear and tear of the second transverse member as a result of friction with the rod concerned, the second transverse member is provided with a groove for at least partially accommodating the rod concerned. Said groove may be a recess which is arranged in the second transverse member, for instance by means of punching, but additionally may for instance be formed by making the second transverse member V-shaped.

The rods and the connection elements may be made of metal and be secured to each other by means of welding, or a press fit of the rod into one or more of the above-mentioned first and third openings.

Alternatively, the rods and the connection elements may be made of a synthetic material and be secured to each other by means of heat welding, adhesive or a press fit of the rod into one or more of the above-mentioned first and third openings.

The invention will be elucidated on the basis of the drawing, in which:

FIG. 1 shows a schematic top view of a part of the device according to the present invention, and FIGS. 2A, 2B and 2C show on an enlarged scale a top view on a connection element of the device according to FIG. 1, without end with a rod secured thereto, respectively, and a side view on FIG. 2C.

Figure 2D:
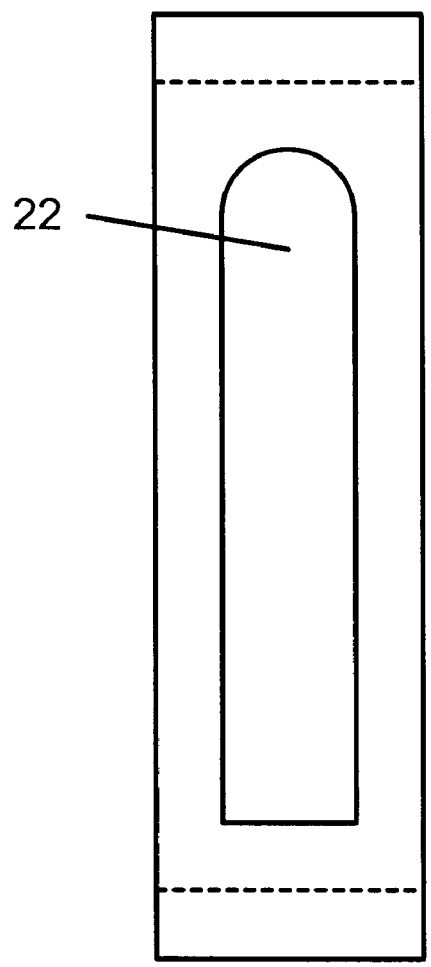
FIG. 2D shows a side view of the connection element of the device with a common opening.

A device according to the present invention for conveying objects, such as dough or other products, is shown schematic in top view in FIG. 1 Said device has opposite edges (2,3). The device, also called conveyor belt, further comprises a large number of rods (1a, 1b, 1c . . . ), preferably made of metal, but alternatively for instance made of a synthetic material. Each rod (1a, 1b, 1c) has a first (4a, 4b, 4c . . . ) and a second (5a, 5b, 5c . . . ) end.

Adjacent rods (1b, 1c) are mutually connected at their ends (4b, 4c) by connection elements (6, 7), preferably made of metal, but alternatively for instance made of a synthetic material, different from or identical to the material of which the rods are made Each connection element (6) is substantially S-shaped in top view and is provided with a first free end (8) which is situated directed to a centre between the first (4c) and second (5c) end of the rod (1c). The connection element (6) is further provided with a second free end (9) which is situated directed to an edge (2) concerned of the device, with a first transverse member (10) and a second transverse member (11). A first connection member (12) connects the first free end (8) to the first transverse member (10). A second connection member (13) connects the first transverse member (10) to the second transverse member (11), and a third connection member (14) connects the second transverse member (11) to the second free end (9).

The second free end (9) of the connection element (6) is situated at a distance from the second connection member (13), in other words it does not contact the second connection member (13). The first connection member (12) of the connection element (6) is provided with a first opening (15) through which the one (1c) of the adjacent rods extends and with a second opening (16) through which the other (1b) of the adjacent rods extends. The second connection member (13) of the connection element (6) is provided with a third opening (17) through which the one (1c) of the adjacent rods extends over a distance (D) and with a fourth opening (18) through which the other (1b) of the adjacent rods extends. The distance (D) over which the rod (1c) extends beyond the second connection member (13) is of course chosen such that the rod (1c) when the device is used cannot come loose from the third opening (17). Preferably the distance (D) is such that the rod (1c) extends until in abutment with the third connection member (14). As a result a more stable construction is obtained.

The connection element (6) is connected to the one (1c) of the adjacent rods by means of a weld (19) near the first free end (8) of the connection element (6), It has appeared that said one weld (19) already suffices for obtaining a sufficiently stable construction of the device. At heavier loads, for instance for conveying heavy products, it is however preferred that the rod (1c) concerned is connected to the second transverse member (11) of the connection element (6) by means of a further weld (20). Alternatively or additionally the rod (1c) concerned can be connected to the third connection member (14) of the connection element (6) by means of (yet) a further weld (21).

The first, second, third and fourth openings (15, 16, 17, 18) may have different shapes. In order, however, to allow for more play, in particular when travelling curves, the second and fourth openings (16, 18) are slot-shaped.

Furthermore because of saving on weight it is advantageous that the first and second opening and/or third and fourth opening are formed by a common, preferably slot-shaped opening, 22 (as shown in FIG. 2D). Because in this case no material is present in between separate openings, the connection elements are lighter accordingly.

In the embodiment shown the third connection member (14) has a bent shape, so that the second free end (9) is situated further away from the edge (2) of the device than the rest of the third connection member (14). As a result the edges (2, 3) of the device, in particular the second free ends (9) of the connection elements (6), in all cases do not form unwanted projections which may cause possible damage to the drums, or other parts which the device may contact.

A device according to the present invention is suitable for conveying objects along a track, in which the track may have a curve up to a certain minimal radius. In order to ensure that exactly when travelled said curve of minimal radius all forces active on the device are sufficiently absorbed, the third connection member (14) has a pre-determined length (L), which determines the certain minimal radius. Said pre-determined length (L) is such that the free end (9) of a connection element when travelled said curve of minimal radius, will abut the second transverse member (11) of an adjacent connection element, the distance between the adjacent rods near the edge concerned being minimal here. At the other edge of the device the distance between the adjacent rods is maximal. The difference in distances between the rods near the opposite edges, which difference determines the minimal radius of a curve to be travelled, therefore is determined by the length (L) of the third connection member (14).

In order to reduce wear and tear of the first transverse member (10) as a result of the friction with the rod (1c) concerned, the first transverse member (10) preferably is provided with a groove (not shown) for at least partially accommodating the rod (1c) concerned. Said groove may be a recess which is arranged in the first transverse member (10), for instance by means of punching, or may be realized by making the entire element from a V-shaped profile.

Alternatively, the rod la may be secured to the connection element 6 at opening 15 and or opening 17 by means of a press fit. In case the materials used permit so, the securing of the rod to the connection element may be realized by means of an adhesive. Other possible ways of securing are mentioned in the other parts of this patent application and are included here.

What is claimed is:

1. Device for conveying objects along a track having curved track portions, comprising a large number of rods (1a, 1b, 1c . . . ), the device having opposite edges (2, 3) each rod (1a, 1b, 1c) having a first (4a, 4b, 4c . . . ) and a second (5a, 5b, 5c . . . ) end, each two adjacent rods (1b, 1c) being mutually connected at their ends (4b, 4c) by connection elements (6, 7), each connection element (6) being substantially S-shaped in top view and being provided with a first free end (8) which is situated directed to a center between the first (4c) and second (5c) end of the rod (1c), with a second free end (9) which is situated directed to an edge (2) concerned of the device, with a first transverse member (10) and a second transverse member (11), with a first connection member (12) which connects the first free end (8) to the first transverse member (10), with a second connection member (13) which connects the first transverse member (10) to the second transverse member (11), and with a third connection member (14) which connects the second transverse member (11) to the second free end (9), the second free end (9) of the connection element (6) being situated at a distance from the second connection (13), the first connection member (12) of the connection element (6) being provided with a first opening (15) through which a first rod (1c) of the two adjacent rods extends in an extension direction and with a second opening (16) through which a second rod (1b) of the two adjacent rods extends, the second connection member (13) of the connection element (6) being provided with a third opening (17) through which the first rod (1c) of the two adjacent rods extends over a distance (D) in the extension direction and with a fourth opening (18) through which the second rod (1b) of the two adjacent rods extends, and the connection element (6) being secured to the first rod (1c) of the two adjacent rods near (19) the first free end (8) of the connection element (6), wherein the third connection member (14) has a predetermined length (L) so that the second free end (9) is located in front of and at a distance from the second (16) opening, when considered in a direction parallel to the direction of extension of the first rod, and forms an abutment for the second transverse member (11) of a connection element (6) on the second rod, so as to determine a minimal value for the radius of the device in a curved track portion.

2. Device according to claim 1, the rods (1a, 1b, 1c) being made of metal.

3. Device according to claim 1, the connection elements (6) being made of metal.

4. Device according to claim 1, the rods (1a, 1b, 1c) being made of synthetic material.

5. Device according to claim 1, the connection elements (6) being made of synthetic material.

6. Device according to claim 1, the second and fourth openings (16, 18) being slot-shaped.

7. Device for conveying objects along a track having curved track portions, comprising a large number of rods (1a, 1b, 1c) the device having opposite edges (2, 3), each rod (1a, 1b, 1c . . . ) having a first (4a, 4b, 4c . . . ) and a second (5a, 5b, 5c . . . ) end, each two adjacent rods (1b, 1c) being mutually connected at their ends (4b, 4c) by connection elements (6, 7), each connection element (6) being substantially S-shaped in top view and being provided with a first free end (8) which is situated directed to a center between the first (4c) and second (5c) end of the rod (1c), with a second free end (9) which is situated directed to an edge (2) concerned of the device, with a first transverse member (10) and a second transverse member (11), with a first connection member (12) which connects the first free end (8) to the first transverse member (10), with a second connection member (13) which connects the first transverse member (10) to the second transverse member (11), and with a third connection member (14) which connects the second transverse member (11) to the second free end (9), the second free end (9) of the connection element (6) being situated at a distance from the second connection member (13), the first connection member (12) of the connection element (6) being provided with a first opening (15) through which a first rod (1c) of the two adjacent rods extends and with a second opening (16) through which a second rod (1b) of the two adjacent rods extends, the second connection member (13) of the connection element (6) being provided with a third opening (17) through which the first rod (1c) of the two adjacent rods extends over a distance (D) and with a fourth opening (18) through which the second rod (1b) of the two adjacent rods extends, and the connection element (6) being secured to the first rod (1c) of the two adjacent rods near (19) the first free end (8) of the connection element (6), the first (15) and second (16) opening merging into one another to form a slot-shaped opening, and the third (17) and fourth (18) opening merging into one another to form a slot-shaped opening.

8. Device according to claim 1, the distance (D) being such that the first rod (1c) extends beyond the third opening (17).

9. Device according to claim 8, the distance (D) being such that the first rod (1c) extends until in abutment with the third connection member (14).

10. Device for conveying objects along a track having curved track portions, comprising a large number of rods (1a, 1b, 1c . . . ), the device having opposite edges (2, 3), each rod (1a, 1b, 1c) having a first (4a, 4b, 4c . . . ) and a second (5a, 5b, 5c . . . ) end, each two adjacent rods (1b, 1c) being mutually connected at their ends (4b, 4c) by connection elements (6, 7), each connection element (6) being substantially S-shaped in top view and being provided with a first free end (8) which is situated directed to a center between the first (4c) and second (5c) end of the rod (1c), with a second free end (9) which is situated directed to an edge (2) concerned of the device, with a first transverse member (10) and a second transverse member (11), with a first connection member (12) which connects the first free end (8) to the first transverse member (10), with a second connection member (13) which connects the first transverse member (10) to the second transverse member (11), and with a third connection member (14) which connects the second transverse member (11) to the second free end (9), the second free end (9) of the connection element (6) being situated at a distance from the second connection member (13), the first connection member (12) of the connection element (6) being provided with a first opening (15) through which a first rod (1c) of the two adjacent rods extends and with a second opening (16) through which a second rod (1b) of the two adjacent rods extends, the second connection member (13) of the connection element (6) being provided with a third opening (17) through which the first rod (1c) of the two adjacent rods extends over a distance (D) and with a fourth opening (18) through which the second rod (1b) of the two adjacent rods extends, and the connection element (6) being secured to the first rod (1c) of the two adjacent rods near (19) the first free end (8) of the connection element (6), the first rod (1c) being secured to the second transverse member (11) of the connection element (6) at the location of the second transverse member (1).

11. Device according to claim 9, the first rod (1c) being secured to the third connection member (14) of the connection element (6).

12. Device according to claim 1, the third connection member (14) having a bent shape, so that the second free end (9) is situated further away from the edge (2) of the device than the rest of the third connection member (14).

13. Device according to claim 1, the connection element (6) being made of V-shaped profile.

14. Device according to claim 1, wherein the rod is secured to the connection element by means of a weld (19, 20, 21).

15. Device according to claim 1, wherein the first rod is secured to the connection element by means of a press fit in the first (15) opening.

16. Device according to claim 4, the connection elements (6) being made of synthetic material, wherein the first rod is secured to the connection element by means of adhesive.

17. Device according to claim 1, wherein the first rod is secured to the connection element by means of a press fit in the third (17) opening.

18. Device according to claim 4, the connection elements (6) being made of synthetic material, wherein the first rod is secured to the connection element by means of heatwelding.

19. Device according to claim 4, the connection elements (6) being made of synthetic material, wherein the first rod is secured to the connection element by means of snap fitting.

20. Device for conveying objects along a track having curved track portions, comprising a large number of rods (1a, 1b, 1c . . . ), the device having opposite edges (2, 3), each rod (1a, 1b, 1c) having a first (4a, 4b, 4c . . . ) and a second (5a, 5b, 5c . . . ) end, each two adjacent rods (1b, 1c) being mutually connected at their ends (4b, 4c) by connection elements (6, 7), each connection element (6) being substantially S-shaped in top view and being provided with a first free end (8) which is situated directed to a center between the first (4c) and second (5c) end of the rod (1c), with a second free end (9) which is situated directed to an edge (2) concerned of the device, with a first transverse member (10) and a second transverse member (11), with a first connection member (12) which connects the first free end (8) to the first transverse member (10), with a second connection member (13) which connects the first transverse member (10) to the second transverse member (11), and with a third connection member (14) which connects the second transverse member (11) to the second free end (9), the second free end (9) of the connection element (6) being situated at a distance from the second connection member (13), the first connection member (12) of the connection element (6) being provided with a first opening (15) through which a first rod (1c) of the two adjacent rods extends and with a second opening (16) through which a second rod (1b) of the two adjacent rods extends, the second connection member (13) of the connection element (6) being provided with a third opening (17) through which the first rod (1c) of the two adjacent rods extends over a distance (D) and with a fourth opening (18) through which the second rod (1b) of the two adjacent rods extends, and the connection element (6) being secured to the first rod (1c) of the two adjacent rods near (19) the first free end (8) of the connection element (6), wherein the first connection member (12) and the second connection member (13) each have a straight form.

* * * * *